(12) United States Patent
Rangarajan et al.

(10) Patent No.: US 6,275,225 B1
(45) Date of Patent: *Aug. 14, 2001

(54) METHOD, APPARATUS, SYSTEM AND COMPUTER PROGRAM PRODUCT FOR A USER-CONFIGURABLE GRAPHICAL USER INTERFACE

(75) Inventors: Govindarajan Rangarajan, Sunnyvale; Eugene Krivopaltsev, San Jose; Joe Scarpelli, Mountain View; Jonathan Nelson, San Ramon; Akhil Arora, San Jose; Xuesi Dong, Sunnyvale, all of CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/958,378

(22) Filed: Oct. 24, 1997

(51) Int. Cl.⁷ .................................................. G06F 3/14
(52) U.S. Cl. ..................... 345/333; 345/339; 345/334; 345/336; 345/969; 707/223; 707/224
(58) Field of Search ............................. 345/333, 334, 345/338, 336, 339, 969, 975; 707/223, 224

(56) References Cited

U.S. PATENT DOCUMENTS

| | | |
|---|---|---|
| 5,394,523 | 2/1995 | Harris ........................... 345/501 |
| 5,428,722 | 6/1995 | Marsh et al. .................. 345/433 |
| 5,428,744 | 6/1995 | Webb et al. ................... 345/524 |
| 5,455,599 | 10/1995 | Cabral et al. ................. 345/418 |
| 5,465,362 | 11/1995 | Orton et al. ................... 709/107 |
| 5,479,589 | 12/1995 | Peterson et al. .............. 345/339 |
| 5,517,606 | 5/1996 | Matheny et al. .............. 345/352 |
| 5,519,818 | 5/1996 | Peterson ....................... 345/326 |
| 5,522,025 | 5/1996 | Rosenstein .................... 345/340 |
| 5,544,301 | 8/1996 | Orton et al. ................... 345/342 |
| 5,555,368 | 9/1996 | Orton et al. ................... 345/344 |
| 5,574,843 | * 11/1996 | Gerlach, Jr. .................. 345/338 |
| 5,621,434 | 4/1997 | Marsh ........................... 345/426 |
| 5,634,129 | 5/1997 | Dickinson ..................... 709/303 |
| 5,675,752 | * 10/1997 | Scott et al. .................... 345/333 |
| 5,706,456 | * 1/1998 | Dupper et al. ................ 345/335 |
| 5,802,530 | * 9/1998 | Van Hoff ....................... 345/335 |
| 5,805,166 | * 9/1998 | Hall, Jr. et al. ............... 345/969 |
| 5,828,376 | * 1/2000 | Solimene et al. ............. 345/352 |
| 5,867,162 | * 2/1999 | O'Leary et al. ............... 345/352 |
| 5,958,012 | * 9/1999 | Battat et al. ................... 345/969 |
| 5,978,043 | * 11/1999 | Blonstein et al. ............. 348/569 |
| 5,986,652 | * 11/1999 | Medl et al. .................... 345/333 |
| 5,995,933 | * 11/1999 | Fado et al. .................... 345/978 |
| 6,014,138 | * 1/2000 | Cain et al. ..................... 345/335 |

\* cited by examiner

*Primary Examiner*—Raymond J. Bayerl
*Assistant Examiner*—Thomas T. Nguyen
(74) *Attorney, Agent, or Firm*—Beyer Weaver & Thomas, LLP

(57) ABSTRACT

Apparatus, methods and computer program products are disclosed that allow the user of an application to customize the graphical user interface (GUI) for the user's needs. The invention engages in a dialog with the user to determine which GUI features are desired by the user. Depending on the user's answers a model representation of the GUI (a configuration) is saved. The invention provides the user with the ability to select and use the saved configurations.

20 Claims, 9 Drawing Sheets

METHOD, APPARATUS, SYSTEM AND COMPUTER PROGRAM PRODUCT FOR A USER-CONFIGURABLE GRAPHICAL USER INTERFACE

BACKGROUND OF THE INVENTION

1. Field of the Invention

This invention relates to the field graphical user interfaces (GUIs) that allow a computer user to interact with a computer. In particular the invention provides the user with the ability to customize the GUI to best meet the user's needs.

2. Background

A graphical user interface allows a user to interact with a computer by pointing at selectable control areas on the computer display and activating a command or computer operation associated with the selectable control area to cause the computer to perform an operation. Computer applications have a plethora of user selectable operations that comprise a set of features for the application. These operations are presented to the user by the GUI. The user moves a cursor, responsive to a pointing device, over a selectable control area (SCA) on the display. Then the user activates the pointing device to invoke the operation associated with the SCA. The SCA can be indicated on the display by the use of an icon, a menu, a popup, a toolbar (a selection of icons grouped together) or other similar controls. When the computer application supports a large set of features, the number of SCAs, associated with the features, becomes unwieldy. With a large number of SCAs, the user often forgets what operation is represented by the icon or forgets which menu is used to invoke the operation and thus is less efficient when using the application.

Complex GUIs are common in the problem domain of network management. Often different network administrators are responsible for different devices and functions on the network. The network generally consists of multiple types of computers (or other network devices) with different operating systems and capabilities. Generalized network management applications traditionally have been written for specific computer/operating system configurations. Java allows a single application to run on multiple computer/operating system configurations (often in a client/server configuration) to provide network management capabilities without needing to customize the application for each computer/operating system configuration. However, generalized network management applications tend to make the GUI more complex and confusing to the user.

Application "wizard" capabilities have long been used to generate document templates. Many commercially available products provide a wizard to lead a user through an interrogatory session to generate a document template such as a pre-formatted letter, spreadsheet or software program. In addition, many applications allow the user to manually select GUI related facilities. One example of this is the selection of functions and icons that are included in a toolbar displayed to the user. Selecting the functions which can be accessed through a toolbar is difficult because the user must know that the desired functions exist and know how to select them.

It would be advantageous to allow the user of rich functionality computer applications (such as network management applications) to be guided through a GUI customization process that generates a GUI tailored to the user's needs with respect to a particular problem domain.

SUMMARY OF THE INVENTION

The present invention provides an apparatus, method, system and computer program product that enables a user to modify a graphical user interface to meet the user's needs.

One aspect of the invention includes a computer controlled method that allows a user of a computer application that uses a graphical user interface (GUI) having a set of features, to customize the user's interaction with the computer application through the GUI. The method includes the step of presenting one or more interrogatories to the user so as to obtain one or more answers responsive to the one or more interrogatories. The method also includes the step of customizing the GUI to select a selected feature set from the set of features. The selection step is responsive to the one or more answers received from the user. In addition, the method includes the step of presenting the selected feature set to the user.

Another aspect of the invention includes an apparatus, having a central processing unit (CPU) and a memory coupled to the CPU, for allowing a user of a computer application to customize the user's interaction with the computer application through a graphical user interface (GUI). The computer application GUI has a set of features. The apparatus includes an interrogatory mechanism that is configured to present one or more interrogatories to the user. The interrogatory mechanism also obtains one or more answers from the user responsive to the one or more interrogatories. A GUI customization mechanism is configured to customize the GUI to select a selected feature set from the set of features of the GUI. The GUI customization mechanism is responsive to the one or more answers obtained by the interrogatory mechanism. In addition, the apparatus includes a presentation mechanism configured to present the selected feature set to the user.

An additional aspect of the invention is a computer controlled system, having a central processing unit (CPU) and a memory coupled to said CPU, for allowing a user of a computer application that uses a graphical user interface (GUI), to customize the user's interaction with the computer application through the GUI. The GUI has a set of features. The system comprises an interrogatory mechanism configured to present one or more interrogatories to the user and to obtain one or more answers responsive to the one or more interrogatories. Additionally, a GUI customization mechanism, that is configured to customize the GUI, is responsive to the one or more answers obtained by the interrogatory mechanism, to select a selected feature set from the set of features. The system also includes a presentation mechanism that is configured to present the selected feature set to the user.

Yet a further aspect of the invention includes a computer program product embedded in a computer usable medium for causing a computer to enable a user of a computer application that uses a graphical user interface (GUI) having a set of features, to customize the user's interaction with the computer application through the GUI. When executed on a computer, the computer readable code causes a computer to effect an interrogatory mechanism, a GUI customization mechanism and a presentation mechanism. Each of these mechanisms having the same functions as the corresponding mechanisms for the previously described system.

These and other features of the invention will become apparent when the following detailed description is read in combination with the accompanying figures.

DESCRIPTION OF THE PREFERRED EMBODIMENTS

Notations and Nomenclature

Figure 1:
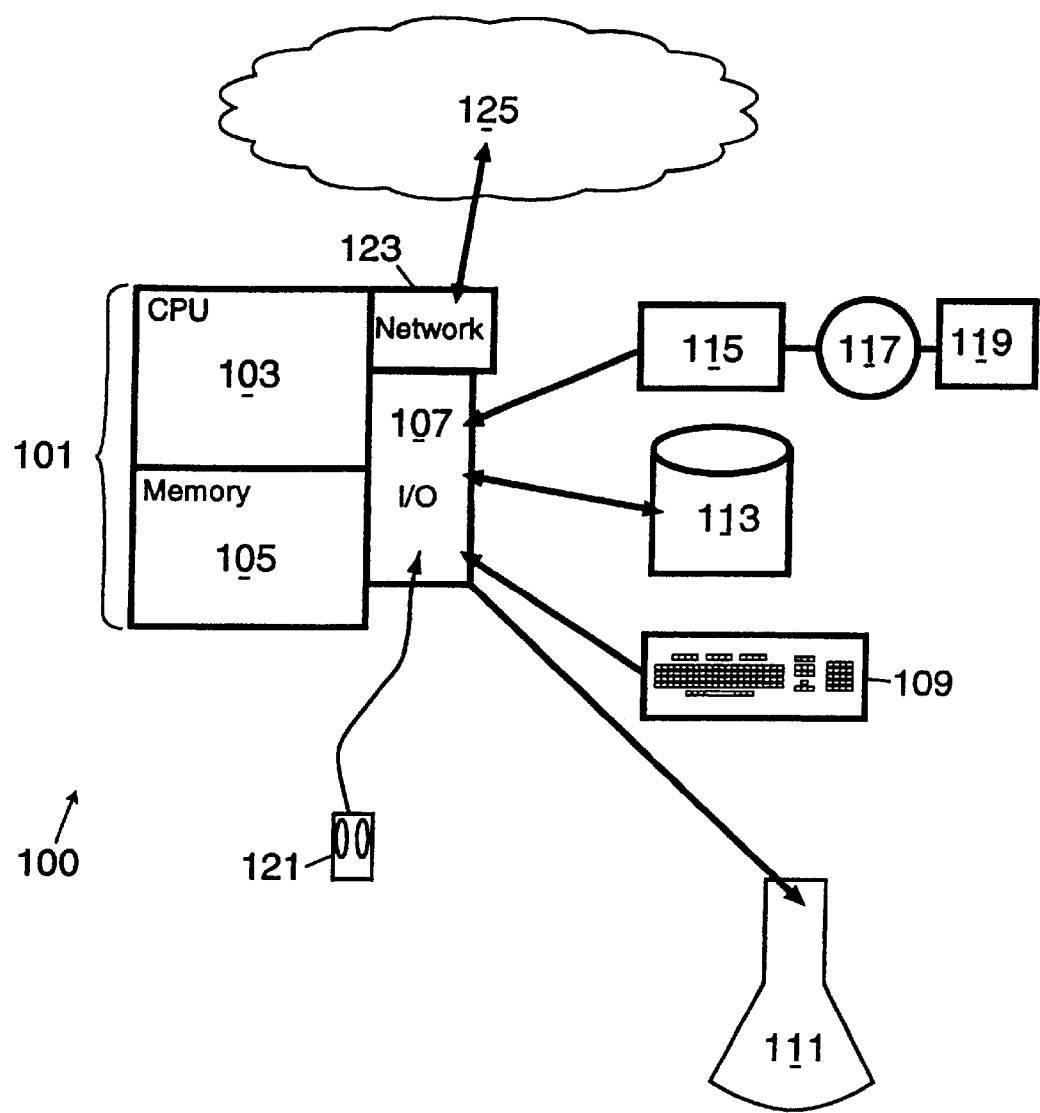
FIG. 1 illustrates a computer system capable of using the invention in accordance with a preferred embodiment.

The following 'notations and nomenclature' are provided to assist in the understanding of the present invention and the preferred embodiments thereof.

Graphical User Interface (GUI)—A user interface that allows a user to interact with a computer using a computer display. This interaction is accomplished by pointing at selectable control areas on the display and activating a command or computer operation associated with the selectable control area. GUIs are well known in the art.

Pointing device—A device that is responsive to a computer user's input that moves an indicator on a computer display screen. Such an indicator has an active point such that if the pointing device is activated (for example, by a button push for a mouse device) a command associated with the selectable control area covered by the active point is invoked. The pointing device can often be positioned through the use of keyboard commands. Graphical User Interfaces generally use pointing devices.

Selectable control area—An area on a computer display that is sensitive to activation of a pointing device. Activation of the pointing device over the selectable control area invokes a command or computer operation associated with the selectable control area. Most computer systems that provide a GUI also provide other methods for invoking these commands or computer operations such as keyboard function keys or command lines.

Pane—An area in a window where information is provided.

User—A human who uses a computer.

Window—An area, usually rectangular, on a computer display screen controlled by an application.

Procedure—A self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Overview

The manipulations performed by a computer in executing programmed instructions are often referred to in terms that are commonly associated with mental operations performed by a human operator, such as adding or comparing. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the programmed logic.

Operating Environment

Some of the elements of a computer, as indicated by general reference character 100, configured to support the invention are shown in FIG. 1 wherein a processor 101 is shown, having a central processor unit (CPU) 103, a memory section 105 and an input/output (I/O) section 107. The I/O section 107 is connected to a keyboard 109, a display unit 111, a disk storage unit 113 and a CD-ROM drive unit 115. The CD-ROM drive unit 115 can read a CDROM medium 117 that typically contains a program and data 119. The CD-ROM drive unit 115, along with the CD-ROM medium 117, and the disk storage unit 113 comprise a file storage mechanism. One skilled in the art will understand that the CD-ROM drive unit 115 can be replace by a floppy disk, magnetic tape unit or similar device that accepts a removable media that can contain the program and data 119. In addition, the computer 100 also has a network interface 123 that is used to connect the computer 100 to a network 125. Such a computer system is capable of executing programs that embody the invention.

One aspect of the invention is a network management console application that displays network management information to a network administrator. This console application executes on a computer system such as the one described with respect to FIG. 1 or on a Java system (such as most web browser enabled systems). The network administrator is generally one of a number of administrators responsible for the entire network. Each administrator is a computer user that is responsible for a given set of network devices. The console application provides each network administrator with the capability to view network faults, browse the network topology, view device details, and create configurations customized to the needs of the administrator. The configuration includes the GUI features, devices and views that are desired by the administrator. The network management console generally accesses information from a management information server (MIS) that acquires and stores data about the network devices. One skilled in the art will understand that the invention can be used in many different applications. One skilled in the art will understand that the invention can be applied to many problem domains and need not be limited to the network management domain.

Figure 2:
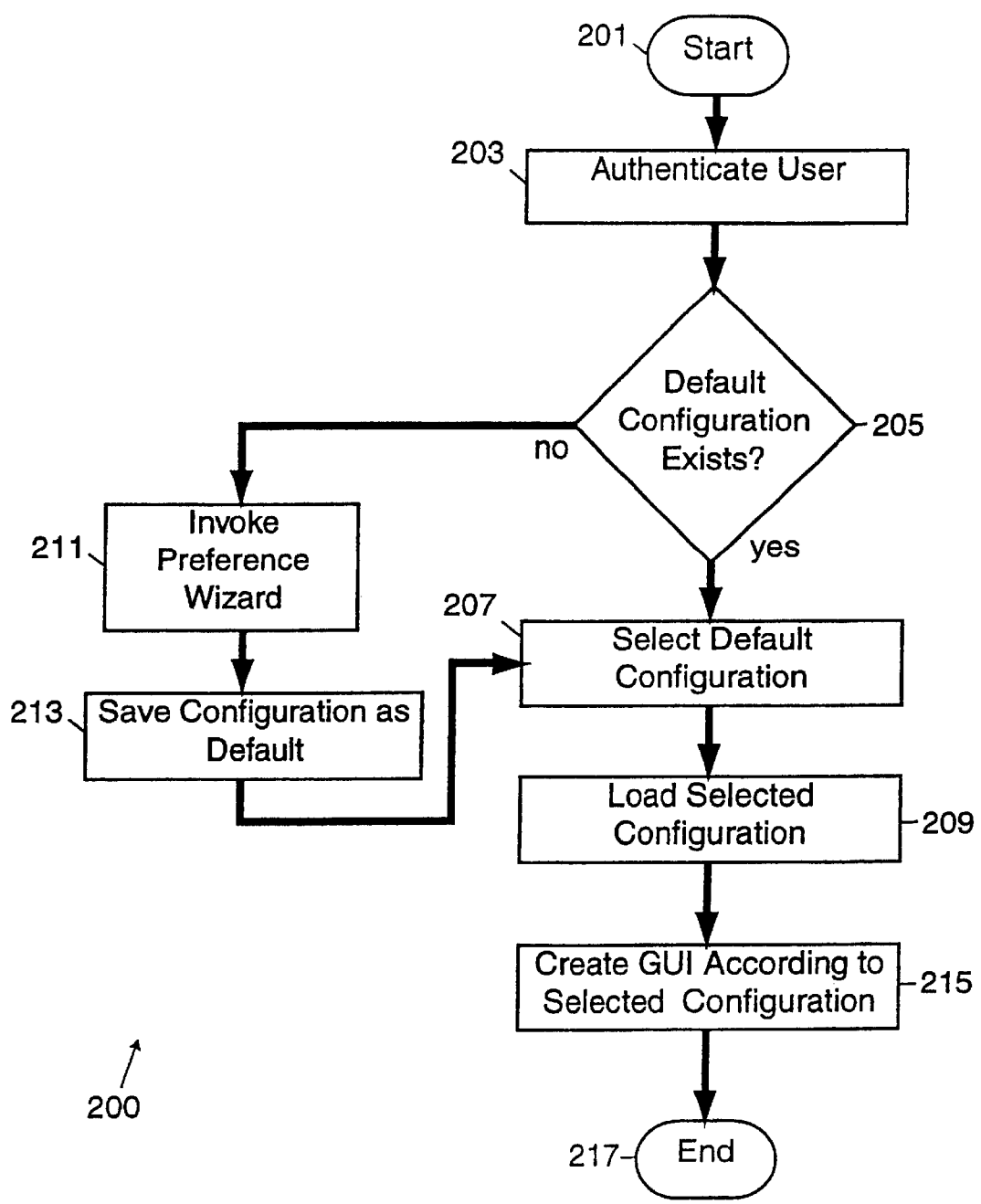
FIG. 2 illustrates an initialization process used in accordance with a preferred embodiment.

FIG. 2 illustrates an initialization process, indicated by general reference character 200, executed when an application that uses the invention is invoked by the user. The initialization process 200 begins at a 'start' terminal 201 and continues to an 'authenticate user' procedure 203. The 'authenticate user' procedure 203 presents a dialog to the user asking for the user's identification, password, and the desired data server system that contains the information to be accessed by the application. Next, the 'authenticate user' procedure 203 verifies that the provided user identification and password are valid. Then the initialization process 200 continues to a 'default configuration exists' decision procedure 205 that determines whether a default GUI configuration exists for this user. If a default configuration exists, the initialization process 200 continues to a 'select default configuration' procedure 207. The 'select default configuration' procedure 207 locates the saved default configuration from the set of saved configurations available to the authenticated user. Once the saved default configuration is selected, it is loaded by a 'load selected configuration' procedure 209.

However, if the 'default configuration exists' decision procedure 205 determined that a default configuration did not exist for the authenticated user, the initialization process 200 continues to an 'invoke preference wizard' procedure 211. The 'invoke preference wizard' procedure 211 performs a dialog with the user to determine the desired selected feature set of the GUI. The details of the procedure invoked by the 'invoke preference wizard' procedure 211 are subsequently described with respect to FIG. 3. After the configuration is generated, the configuration is saved as the default configuration by a 'save configuration as default' procedure 213. Next the initialization process 200 continues to the 'select default configuration' procedure 207 (previously discussed) and the 'load selected configuration' procedure 209 that loads the just created default configuration.

After loading the configuration, the initialization process 200 continues to a 'create GUI according to selected configuration' procedure 215 that processes the information stored in the selected configuration to create a user configured GUI that contains the selected feature set. Thus, the user configured GUI is processed to restore the selected feature set previously saved by the user. The user-configured GUI is usually presented to the user on the display unit 111. Finally, the initialization process 200 completes through an 'end' terminal 217. In the context of a network management console, the initialization process 200 determines the management domain of the network administrator. The administrator specifies which portion of the network, views, types of devices, and particular devices that are the responsibility of the administrator.

Figure 3:
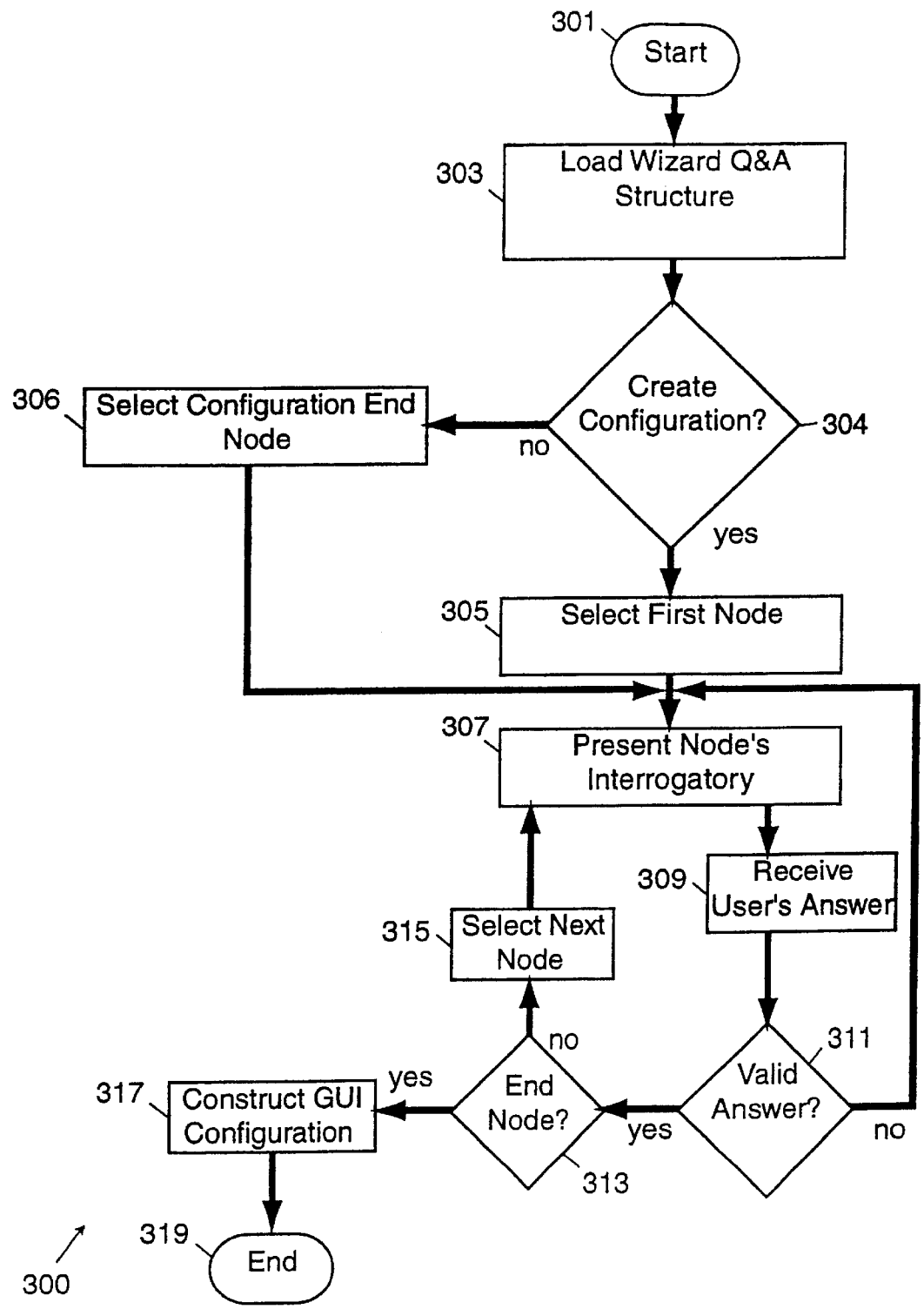
FIG. 3 illustrates a wizard process used to gather user information in accordance with a preferred embodiment.

FIG. 3 illustrates a wizard process, indicated by general reference character 300, for obtaining the user's preferences for the GUI. The wizard process allows the user to select a selected feature set from a set of features that can be provided by the GUI. The set of features includes SCAs, and their related services for operating the GUI, and problem-domain specific capabilities. For example, in the network management domain, multiple network administrators monitor and maintain the network. Generally these network administrators are responsible for a limited number of networked devices. Thus such an administrator would use the wizard to construct a GUI that displays information about the networked devices for which the network administrator has responsibility.

The wizard process 300 initiates at a 'start' terminal 301 and continues to a 'load wizard Q&A data structure' procedure 303 that loads a wizard data structure. This data structure includes nodes that contain the possible interrogatories that can be presented to the user and the interrogatory dependencies that depend on the user's responses. After the 'load wizard Q&A data structure' procedure 303 the wizard process 300 continues to a 'create configuration' decision procedure 304 that determines whether the invocation of the wizard process 300 was for the purpose of creating a new configuration or modifying an existing configuration. One skilled in the art will understand that this determination can be based on arguments passed to the wizard process 300, by the process examining a state variable, or other technique known in the art. If the wizard process 300 were to create a new configuration, a 'select first node' procedure 305 locates the starting interrogatory node in the loaded wizard data structure. Otherwise a 'select configuration end node' procedure 306 locates the end node in the wizard data structure that matches the configuration to be modified and reconstructs the state of the wizard data structure to match the actual configuration. Once a node is selected, a 'present node interrogatory' procedure 307 presents the node's interrogatory to the user. This interrogatory may include a representation of the problem domain to allow the user to select which aspects of the problem domain the user desires to access from the GUI. Within the problem domain of network administration such an interrogatory would allow a network administrator to specify a selected feature set that contains the network devices for which the network administrator is responsible. The interrogatory can include additional information such as (without limitation) a list of devices, a network topology map, or a selected fault list. In response to the interrogatory the user is provided with an appropriate mechanism to select one or more items from the information provided with the interrogatory. At a 'receive user's answer' procedure 309, the wizard process 300 receives the user's answer to the presented interrogatory. Then a 'valid answer' decision procedure 311 checks the user's answer for validity. If the user's answer is not valid the wizard process 300 returns to the 'present node interrogatory' procedure 307 to again present the interrogatory (possibly with an error or help message). However, if the user's answer was valid the wizard process 300 continues to an 'end node' decision procedure 313 that determines whether the current node was an end node. If the current node is not an end node the wizard process 300 continues to a 'select next node' procedure 315 that selects the next node of the data structure based on the user's answers, position in the data structure and the state of navigational SCAs (such as a "previous" or "next" button). Then the wizard process 300 continues back to the 'present node interrogatory' procedure 307 to present the interrogatory in the newly selected node. However, if the 'end node' decision procedure 313 determines that the current nodes is an end node, the wizard process 300 continues to a 'construct GUI configuration' procedure 317 that constructs the customized GUI configuration dependent on the user's responses to the interrogatories. Finally, the wizard process 300 completes through an 'end' terminal 319.

One skilled in the art will understand that the dialog presented by the wizard includes navigational SCAs used to navigate through the data structure allowing the user to change the answer to a previously answered interrogatory. This mechanism allows the user to modify the existing wizard data structure by traversing nodes and changing the answer to the node's interrogatory.

Figure 4:
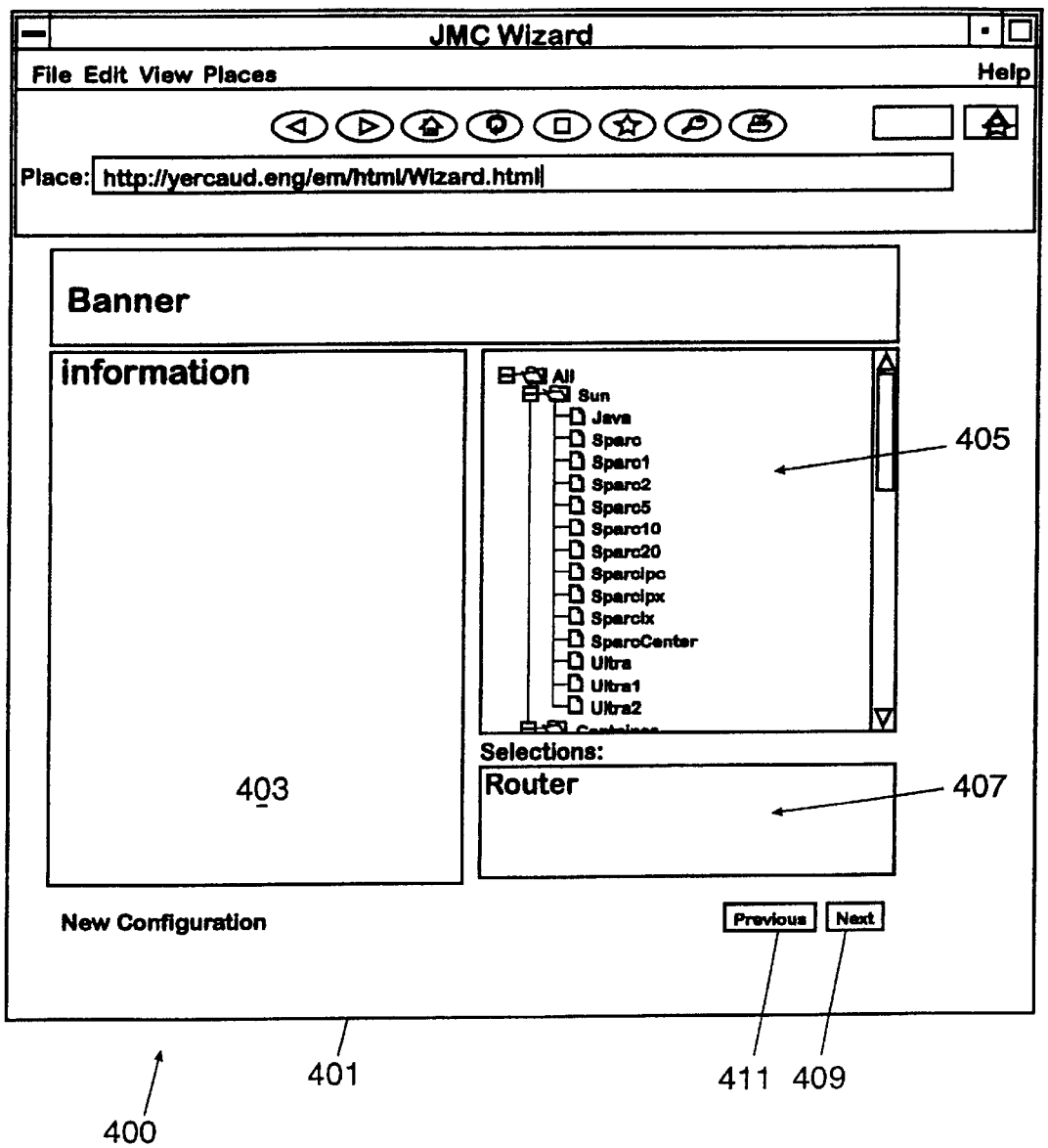
FIG. 4 illustrates an example interrogatory display used to allow the user to select monitored devices in accordance with a preferred embodiment.

FIG. 4 illustrates an interrogatory display, as indicated by general reference character 400, that is presented to a network administrator (user) by the wizard process 300 used in a network administration application. This interrogatory display is presented in a window 401. The window 401 includes an instruction pane 403 that presents instruction text to the network administrator relating to the interaction of the user with a data interaction pane 405. The data interaction pane 405 presents to the network administrator a selection of the set of features. In this instance, the network administrator is able to use the pointing device 121 to select which device types are to be managed. The device types that have been selected by the network administrator are listed in a selection status area 407. In addition, the interrogatory display 400 also includes a 'next' SCA 409 used to advance from the current interrogatory node to the next, and a 'previous' SCA 411 used to go backward to the interrogatory node just previous to the current interrogatory node. One skilled in the art will understand that the 'next' SCA 409 is disabled at an end-node and the 'previous' SCA 411 is disabled at the first node. Other interrogatory windows exist to allow the user to select the particular portions of the network topology that are the responsibility of the network administrator.

Figure 5:
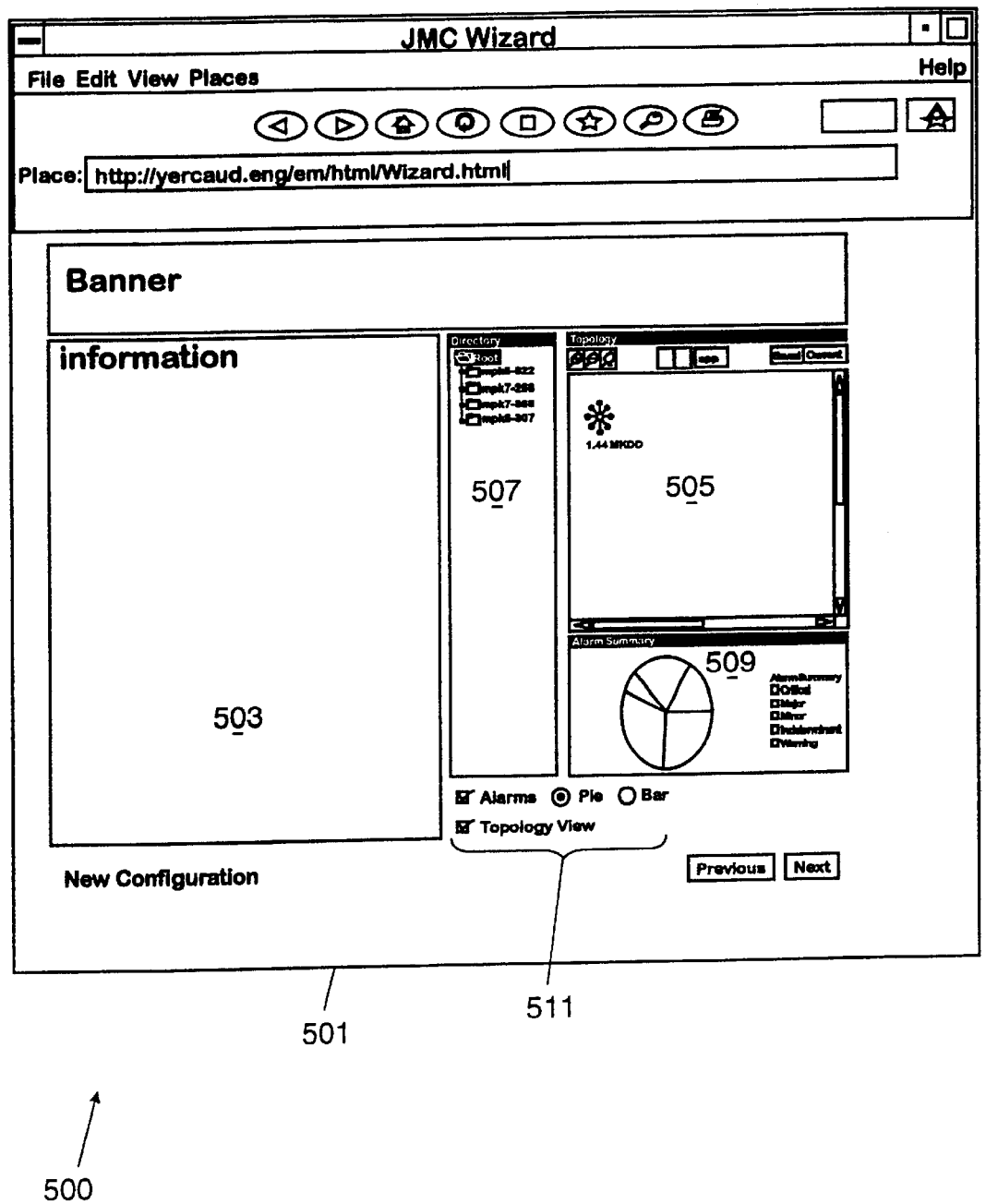
FIG. 5 illustrates an example interrogatory used to specify the information display in accordance with a preferred embodiment.

Once a selected feature set has been specified through the network administrator's interactions with interrogatory displays, similar to the one described with respect to FIG. 4, the wizard presents the network administrator with an information-presentation-interrogatory display, indicated by general reference character 500, as illustrated in FIG. 5. The information-presentation-interrogatory display 500 allows the user to select how the previously selected information is to be presented to the user. Again, the information-presentation-interrogatory display 500 is designed for a given network administration problem domain. Other capabilities may be provided directed to other problem domains. The wizard presents a window 501 to the network administrator that contains an instruction pane 503, a 'topology view' sample pane 505, a 'topology hierarchy' sample pane 507, an 'alarm information summary' sample pane 509 and a display configuration control 511.

The instruction pane 503 presents instruction text to the network administrator relating to the interaction of the user with the information-presentation-interrogatory display 500. The user is able to use the display configuration control 511 to specify the format and the information that the user desires. The display configuration control 511 shown in FIG. 5, directed toward the network administration problem domain, uses an "ALARM" checkbox SCA, a "TOPOLOGY VIEW" checkbox SCA, and a "PIE/BAR" radio selection SCA. The 'topology hierarchy' sample pane 507 contains a representation of the management domain selected by the network administrator. If the "TOPOLOGY VIEW" checkbox SCA is selected, the window 501 also contains a 'topology view' sample pane 505 that previews what the user will see on the active console display. If the "ALARM" SCA is selected, the "PIE/BAR" radio button is enabled and allows the user to select whether the alarm summary will be in the form of a bar or pie chart. The 'alarm information summary' sample pane 509 previews the alarm summary format when the console page is active.

Figure 6:
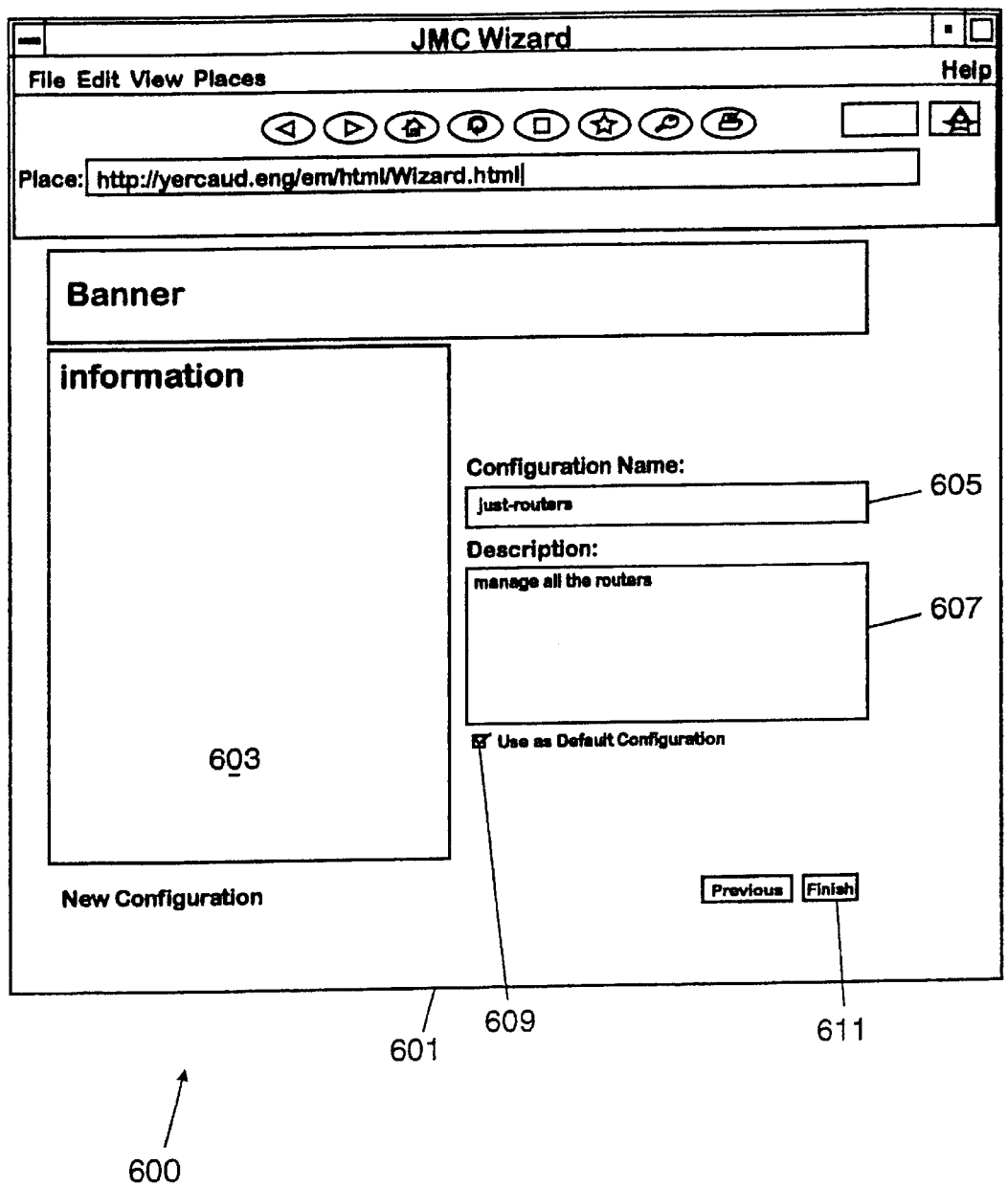
FIG. 6 illustrates a closing interrogatory used to save a configuration in accordance with a preferred embodiment.

FIG. 6 illustrates a save-configuration-interrogatory display, indicated by general reference character 600, for saving the configuration specified by the user's answers (including the selected feature set) to the previous interrogatories. A window 601 contains an instruction pane 603 that presents instruction text to the user. The window 601 also contains a 'configuration name input' field 605 that accepts the user's input. The user inputs the name of the currently defined configuration. The user also inputs the description of the currently defined configuration in a 'configuration description input' field 607. If the currently defined configuration is not the only configuration, the user may specify the currently defined configuration to be the default configuration by selecting a 'make default' SCA 609. As was previously described, if the currently defined configuration is the only configuration, it is made the default configuration. Once the user selects a finish SCA 611, the currently defined configuration is saved.

Figure 7:
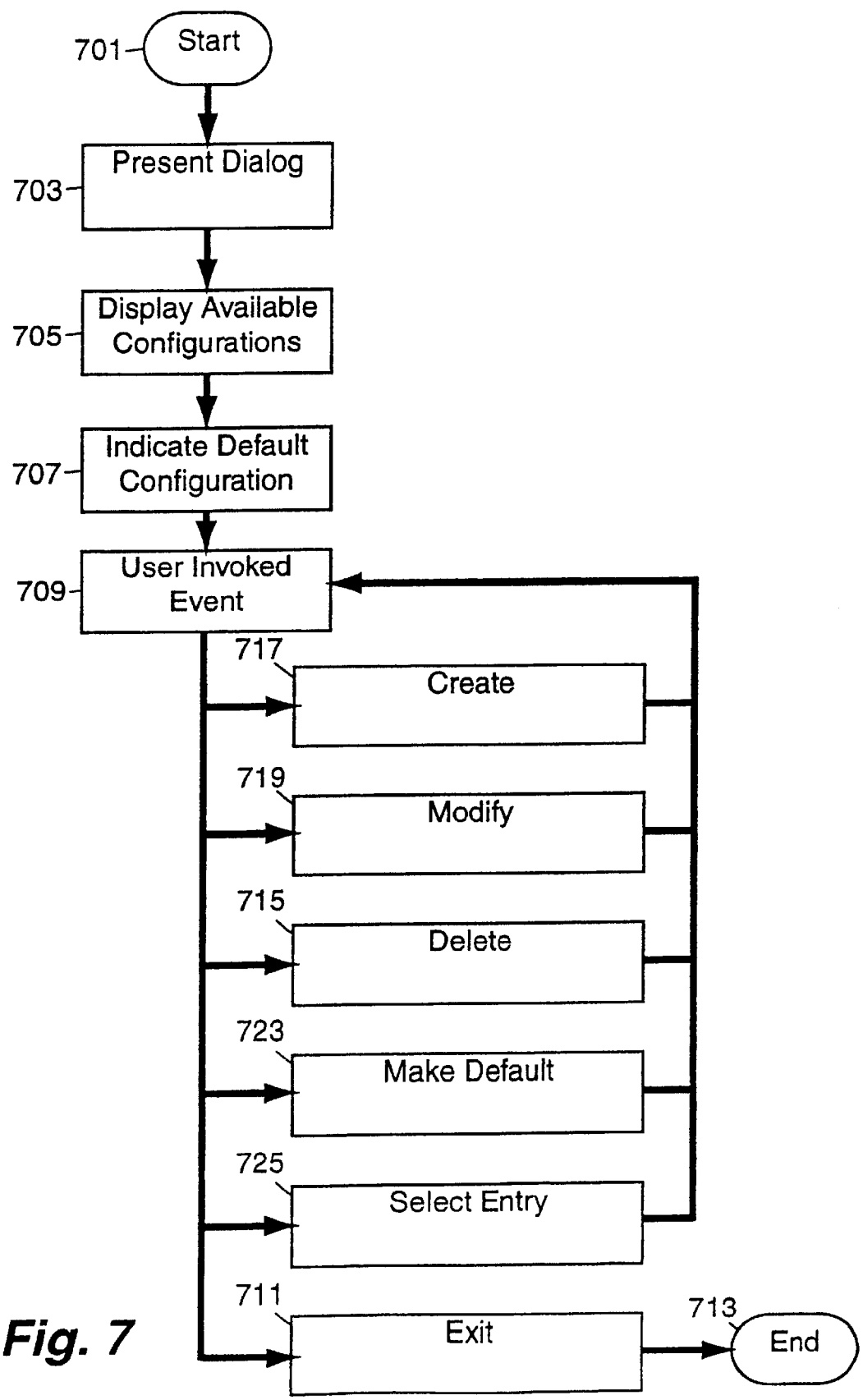
FIG. 7 illustrates a configuration manager process used to gather user information in accordance with a preferred embodiment.

FIG. 7 illustrates a profile manager process, indicated by general reference character 700, for viewing and modifying a stored configuration. The profile manager process 700 initiates at a 'start' terminal 701 and continues to a 'present dialog' procedure 703. The 'present dialog' procedure 703 presents a dialog to the user on the display unit 111. Next, a 'display available configuration' procedure 705 provides a table of configurations that are available to this user. Then, an 'indicate default configuration' procedure 707 indicates which of the displayed configurations is the current default configuration. Next the profile manager process 700 continues to a 'user invoked event' procedure 709. The 'user invoked event' procedure 709 waits for the user to activate a SCA (for example, by using the pointing device 121 to place a cursor over a SCA presented on the display unit 111 and then activating the pointing device 121). The user's activation of the SCA generates an event that indicates which SCA was activated. The 'user invoked event' procedure 709 then dispatches to the appropriate event handler. Those skilled in the art will understand that in an object-oriented methodology a similar result is obtained by sending an activation message to the activated object.

If an SCA is activated to cause the profile manager process 700 to terminate, an 'exitevent' procedure 711 is invoked and removes the dialog from the display unit 111. Then the process completes through an 'end' terminal 713. One skilled in the art will understand that the 'exit-event' procedure 711 may be invoked by a specific exit SCA or by one of a multiple of SCAs that each have additional functionality beyond terminating the profile manager process 700.

If a delete SCA is activated, a delete procedure 715 is invoked that deletes the configuration currently selected in the table. If the default configuration is deleted and no other configuration is selected as the default, the configuration wizard will be automatically invoked when the application is restarted. After the selected configuration is deleted, the profile manager process 700 continues back to the 'user invoked event' procedure 709 for subsequent user invoked events.

If a create entry SCA is activated, a create procedure 717 is invoked that invokes the wizard process 300, previously described, to create a new configuration. Then the profile manager process 700 continues back to the 'user invoked event' procedure 709 for subsequent user invoked events.

If the modify entry SCA is activated, a modify procedure 719 is invoked that recreates the wizard data structure that resulted in the selected configuration. Next the wizard is invoked indicating the terminal node in the data structure that generated the configuration. Thus, the user is able to back track over the previous interrogatories and modify them as appropriate. Then the profile manager process 700 continues to the 'user invoked event' procedure 709 for subsequent user invoked events.

If the make-default SCA is activated, a 'make default' procedure 723 is invoked that makes the selected configuration the default configuration. Then the profile manager process 700 continues to the 'user invoked event' procedure 709 for subsequent user invoked events.

If one of the table entries in the table is selected by the user positioning the cursor over a table entry and activating the pointing device, the profile manager process 700 advances to a 'select entry' procedure 725 that indicates which configuration has been selected for later use by the previously described event processing. Then the profile manager process 700 continues back to the 'user invoked event' procedure 709 for subsequent user invoked events.

Figure 8:
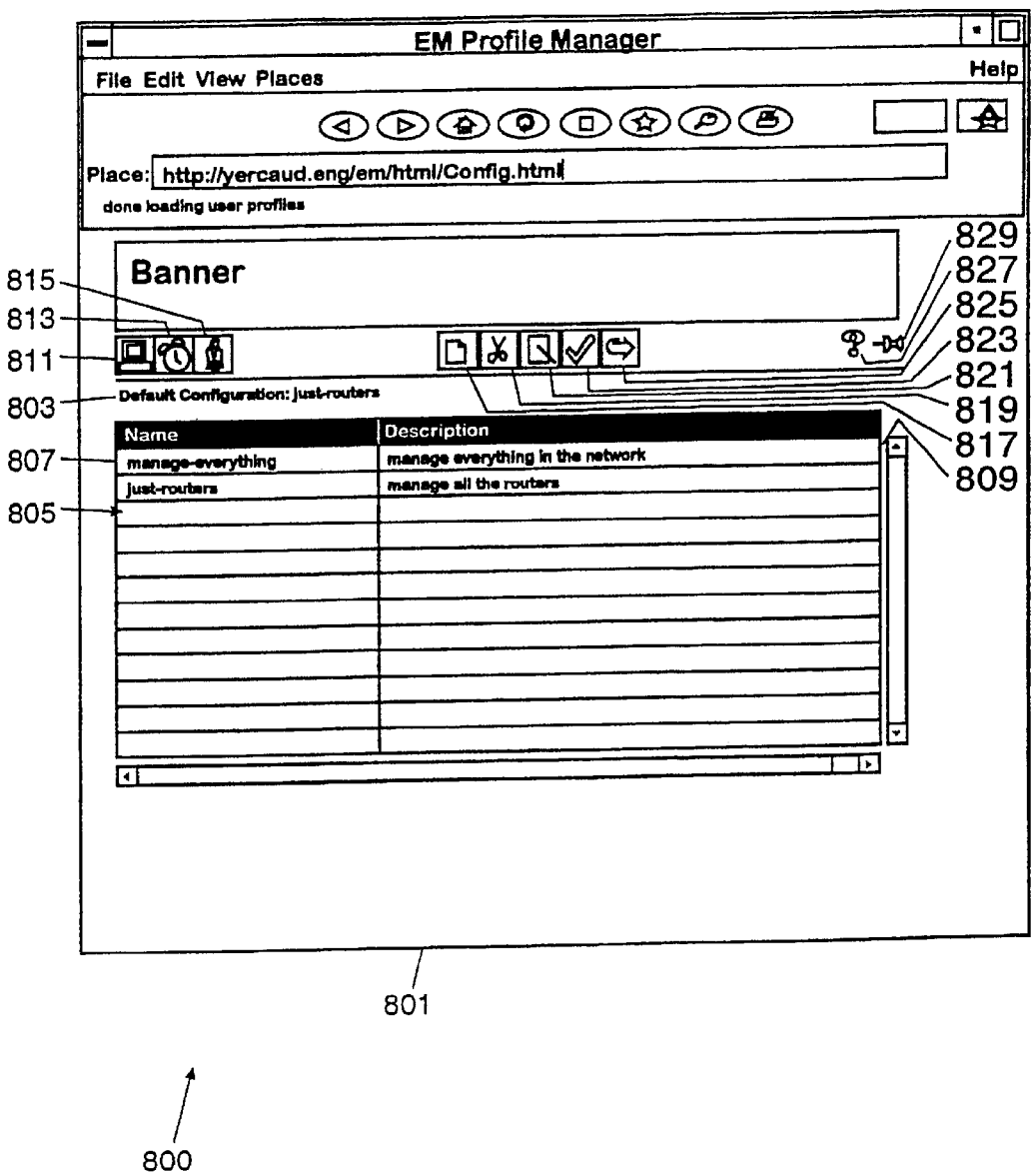
FIG. 8 illustrates a profile manager display used in conjunction with the process of FIG. 7 in accordance with a preferred embodiment.

FIG. 8 illustrates an profile-manager display, indicated by general reference character 800, for managing the configurations stored by the previously described processes. The profile-manager display 800 is invoked by the user selecting the appropriate SCA within the information display console (subsequently described with respect to FIG. 9). Once invoked, the profile-manager display 800 contains a window 801. The profile-manager display 800 presents a default configuration indication 803 that names the configuration used as the default configuration. The profile-manager display 800 also includes a configuration table 805 that lists the name of each configuration owned by the authorized user in a 'configuration name' column 807. The configuration description that corresponds to the configuration name listed in the 'configuration name' column 807 is presented in a 'configuration description' column 809. The profile-manager display 800 includes a selection of SCAs that allow the user to invoke operations. A console SCA 811, when selected, invokes the console display (similar to one that is subsequently described with respect to FIG. 9). An 'alarm detail' SCA 813 invokes an alarm detail display (not shown). A 'profile manager' SCA 815 invokes/reinvokes the profile manager. If the current profile-manager display 800 is locked (as is subsequently described) an additional profile manager is invoked in a new window, otherwise the profile manager is restarted. A 'create configuration' SCA 817 invokes the wizard process 300 previously described with the initial node selected in the data structure. A 'delete configuration' SCA 819 causes the currently selected configuration in the configuration table 805 to be deleted. A 'modify configuration' SCA 821 invokes the wizard process 300, previously described, but uses a reconstructed data structure that corresponds to the currently selected configuration (instead of the original data structure used when creating a new configuration) and selects the appropriate end node as the wizard's starting point. A 'make default configuration' SCA 823 makes the currently selected configuration the default configuration. A 'select and run' SCA 825 makes the selected configuration the current configuration and invokes the console display using the selected configuration while preserving the default configuration. A help SCA 827 invokes a help process that presents information to the user regarding the application. A 'lock display' SCA 829 is a toggle SCA that allows the user to specify that the current window be maintained and that invocation of the other SCAs cause do not cause the current window to be replaced.

Figure 9:
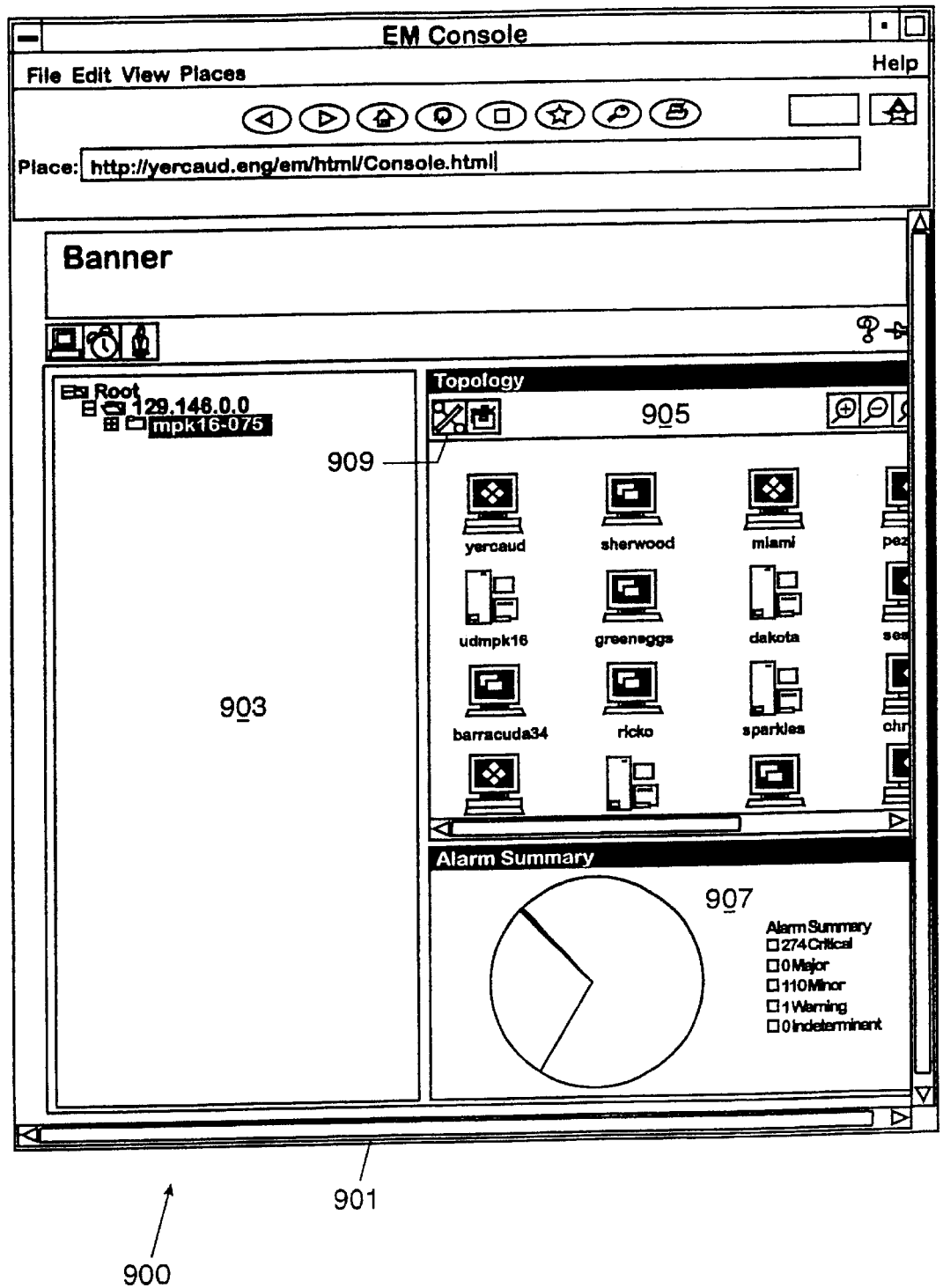
FIG. 9 illustrates a console display resulting from the user's selections.

FIG. 9 illustrates a user-customized GUI indicated by general reference character 900, as used in a network management application. The GUI 900 is within a window 901 that contains a 'topology hierarchy' pane 903, a 'topology view' pane 905, and an 'alarm summary' pane 907. The 'topology hierarchy' pane 903 displays the network hierarchy leading to the selected view. The 'topology view' pane 905 displays icons that represent devices and views accessed through the view selected in the 'topology hierarchy' pane 903. A 'device detail' SCA 909 invokes a device detail display (not shown) for each of the selected devicesviews in the 'topology view' pane 905 at the time the 'device detail' SCA 909 is activated. The device detail display presents a status representation of the selected view or networked device. The 'alarm summary' pane 907 provides a pie chart indicating the relative number of alarms of each severity for the controlled devices. The 'alarm summary' pane 907 can also display a bar chart representation if the user so specified during the GUI customization process. In this problem domain, the information required to generate the above displays is obtained (directly or indirectly) from networked devices.

From the foregoing, it will be appreciated that the invention has (without limitation) the following advantages:

1. The user customizable GUI allows the user to modify a GUI to meet the user's needs.

2. The user customizable GUI allows network administrators to customize their view of network devices and topology dependent on each administrator's responsibility.

3. An interrogatory process simplifies the GUI customization by providing information to the user about the user's choices and accepting the user's choice selections to generate a GUI customized to the user's needs while the application executes.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for allowing a user of a computer application that uses a graphical user interface (GUI), having a set of features, to customize said user's interaction with said computer application through said GUI, said method comprising steps of:

presenting one or more interrogatories, relating to said computer application, to said user;

obtaining from said user at least one response to said one or more interrogatories relating to said computer application;

determining at least one interrogatory relating to presentation of GUI, based upon said at least one response;

presenting said user with said at least one interrogatory relating to presentation of GUI which informs the user of at least one feature of said set of features of said GUI;

obtaining from the user at least one selection from said at least one feature of said set of features of said GUI;

customizing said GUI, in response to said at least one selection relating to said at least one feature of said set of features of said GUI; and presenting said customized GUI to said user.

2. The computer controlled method of claim 1 wherein said computer application is a network management application and said set of features includes a networked device monitored by said network management application.

3. The computer controlled method of claim 2 wherein step (c) further comprises steps of presenting a status representation of said networked device to said user.

4. The computer controlled method of claim 1 wherein step (a) further comprises selecting a second interrogatory responsive to a first answer to a first interrogatory.

5. The computer controlled method of claim 1 wherein step (b) further comprises steps of:
(b1) saving said selected feature set as a configuration; and
(b2) restoring said selected feature set from said configuration.

6. An apparatus, having a central processing unit (CPU) and a memory coupled to said CPU, for allowing a user of a computer application that uses a graphical user interface (GUI) having a set of features, to customize said user's interaction with said computer application through said GUI, said apparatus comprises:
an interrogatory mechanism configured to:
present one or more interrogatories, relating to said computer application, to said user to obtain one or more answers responsive to said one or more interrogatories,
obtain from said user at least one response to said one or more interrogatories relating to said computer application.
determine at least one interrogatory relating to presentation of GUI, based upon said at least one response, and
present said user with said at least one interrogatory relating to presentation of GUI which informs the user of at least one feature of said set of features of said GUI, and
obtain from the user at least one selection from said at least one feature of said set of features of said GUI;
a GUI customization mechanism configured to customize said GUI, in response to said at least one selection relating to said at least one feature of said set of features of said GUI; and
a presentation mechanism configured to present said customized GUI to said user.

7. The apparatus of claim 6 wherein said computer application is a network management application and said set of features includes a networked device monitored by said network management application.

8. The apparatus of claim 7 wherein the presentation mechanism further comprises a device status presentation mechanism configured to present a status representation of said networked device to said user.

9. The apparatus of claim 6 wherein the interrogatory mechanism further comprises an interrogatory selection mechanism configured to select a second interrogatory responsive to a first answer to a first interrogatory.

10. The apparatus of claim 6 wherein the GUI customization mechanism further comprises:
a configuration storage mechanism configured to save said selected feature set as a configuration; and
a configuration retrieval mechanism configured to restore said selected feature set from said configuration.

11. A computer controlled system, having a central processing unit (CPU) and a memory coupled to said CPU, for allowing a user of a computer application that uses a graphical user interface (GUI) having a set of features, to customize said user's interaction with said computer application through said GUI, said system comprises:
an interrogatory mechanism configured to:
present one or more interrogatories, relating to said computer application, to said user to obtain one or more answers responsive to said one or more interrogatories,
obtain from said user at least one response to said one or more interrogatories, relating to said computer application,
determine at least one interrogatory relating to presentation of GUI, based upon said at least one response, and
present said user with said at least one interrogatory relating to presentation of GUI which informs the user of at least one feature of said set of features of said GUI, and
obtain from the user at least one selection from said at least one feature of said set of features of said GUI;
a GUI customization mechanism configured to customize said GUI, in response to said at least one selection relating to said at least one feature of said set of features of said GUI; and
a presentation mechanism configured to present said selected customized GUI to said user.

12. The computer controlled system of claim 11 wherein said computer application is a network management application and said set of features includes a networked device monitored by said network management application.

13. The computer controlled system of claim 12 wherein the presentation mechanism further comprises a device status presentation mechanism configured to present a status representation of said networked device to said user.

14. The computer controlled system of claim 11 wherein the interrogatory mechanism further comprises an interrogatory selection mechanism configured to select a second interrogatory responsive to a first answer to a first interrogatory.

15. The computer controlled system of claim 11 wherein the GUI customization mechanism further comprises:
a configuration storage mechanism configured to save said selected feature set as a configuration; and
a configuration retrieval mechanism configured to restore said selected feature set from said configuration.

16. A computer program product comprising:
a computer usable storage medium having computer readable code embodied therein for causing a computer to enable a user of a computer application that uses a graphical user interface (GUI) having a set of features, to customize said user's interaction with said computer application through said GUI, said computer readable code comprising:
computer readable program code configured to cause said computer to effect an interrogatory mechanism configured to:
present one or more interrogatories, relating to said computer application, to said user to obtain one or more answers responsive to said one or more interrogatories;
obtain from said user at least one response to said one or more interrogatories relating to said computer application,
determine at least one interrogatory relating to presentation of GUI, based upon said at least one response, and
present said user with said at least one interrogatory relating to presentation of GUI which informs the user of at least one feature of said set of features of said GUI, and
obtain from said user at least one selection from said at least one feature of said set of features of said GUI;
computer readable program code configured to cause said computer to effect a GUI customization mechanism configured to customize said GUI, in response to said at least one selection relating to said at least one feature of said set of features of said GUI; and computer readable program code configured to cause said computer to effect a presentation mechanism configured to present said customized GUI to said user.

17. The computer program product of claim 16 wherein said computer application is a network management application and said set of features includes a networked device monitored by said network management application.

18. The computer program product of claim 17 wherein the presentation mechanism further comprises computer readable program code configured to cause said computer to effect a device status presentation mechanism configured to present a status representation of said networked device to said user.

19. The computer program product of claim 16 wherein the interrogatory mechanism further comprises computer readable program code configured to cause said computer to effect an interrogatory selection mechanism configured to select a second interrogatory responsive to a first answer to a first interrogatory.

20. The computer program product of claim 16 wherein the GUI customization mechanism further comprises:

computer readable program code configured to cause said computer to effect a configuration storage mechanism configured to save said selected feature set as a configuration; and computer readable program code configured to cause said computer to effect a configuration retrieval mechanism configured to restore said selected feature set from said configuration.

* * * * *